US012354582B2

(12) United States Patent
Cutler et al.

(10) Patent No.: US 12,354,582 B2
(45) Date of Patent: Jul. 8, 2025

(54) ADAPTIVE ENHANCEMENT OF AUDIO OR VIDEO SIGNALS

(71) Applicant: Microsoft Technology Licensing, LLC, Redmond, WA (US)

(72) Inventors: Ross G. Cutler, Clyde Hill, WA (US); Harishchandra Dubey, Mill Creek, WA (US); Vishak Gopal, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 119 days.

(21) Appl. No.: 18/211,752

(22) Filed: Jun. 20, 2023

(65) Prior Publication Data

US 2024/0428768 A1 Dec. 26, 2024

(51) Int. Cl.
*G10K 11/16* (2006.01)
*H04M 3/56* (2006.01)

(52) U.S. Cl.
CPC .............. *G10K 11/16* (2013.01); *H04M 3/567* (2013.01); *H04M 3/568* (2013.01)

(58) Field of Classification Search
CPC ...... G10K 11/16; H04M 3/567; H04M 3/568; H04M 9/082; G10L 21/0208; G10L 21/02; G10L 15/20; G10L 2021/02082; G10L 19/012; G10L 19/00
See application file for complete search history.

(56) References Cited

U.S. PATENT DOCUMENTS

| 8,705,783 | B1* | 4/2014 | Mishra | H04R 25/558 |
| | | | | 381/314 |
| 2018/0321905 | A1* | 11/2018 | Fountaine | G06F 3/165 |
| 2021/0287691 | A1* | 9/2021 | Rudberg | G10L 21/0208 |
| 2021/0360349 | A1* | 11/2021 | Nyayate | G06N 3/045 |
| 2022/0020388 | A1* | 1/2022 | Trim | H04M 3/568 |
| 2022/0301533 | A1* | 9/2022 | Ban | G10K 11/16 |
| 2022/0383849 | A1* | 12/2022 | Benedetto | A63F 13/54 |
| 2023/0011198 | A1 | 1/2023 | Quinn et al. | |
| 2023/0421702 | A1* | 12/2023 | Cutler | G10L 21/02 |
| 2024/0031489 | A1* | 1/2024 | Lundin | H04M 3/568 |
| 2024/0078995 | A1* | 3/2024 | Ku | G10K 11/17881 |

OTHER PUBLICATIONS

Eskimez, et al., "Personalized speech enhancement: New models and comprehensive evaluation", arXiv:2110.09625v1, Oct. 18, 2021, 5 pages.

(Continued)

*Primary Examiner* — Akelaw Teshale
(74) *Attorney, Agent, or Firm* — Schwegman Lundberg & Woessner, P.A.

(57) ABSTRACT

This document relates to distributed teleconferencing. Some implementations can employ adaptive audio or video enhancement to address scenarios where audio enhancement can tend to remove desirable sounds. For instance, adaptive audio enhancement can involve detecting the presence of a sound, such as clapping, and modifying audio enhancement so that the sound is retained in an enhanced audio signal. Adaptive video processing can involve detecting the presence of the sound and adding a graphical identifier to a video signal that conveys the presence of that sound.

20 Claims, 14 Drawing Sheets

(56) References Cited

OTHER PUBLICATIONS

Feichtenhofer, et al., "Slowfast Networks for Video Recognition", Proceedings of the IEEE/CVF international conference on computer vision, 2019, pp. 6202-6211.

Indenbom, et al., "Deep model with built-in self-attention alignment for acoustic echo cancellation", arXiv preprint arXiv:2208.11308, Aug. 24, 2022, 5 Pages.

Reddy, et al., "Musicnet: Compact Convolutional Neural Network for Real-time Background Music Detection", arXiv:2110.04331, Oct. 8, 2021, 5 pages.

* cited by examiner

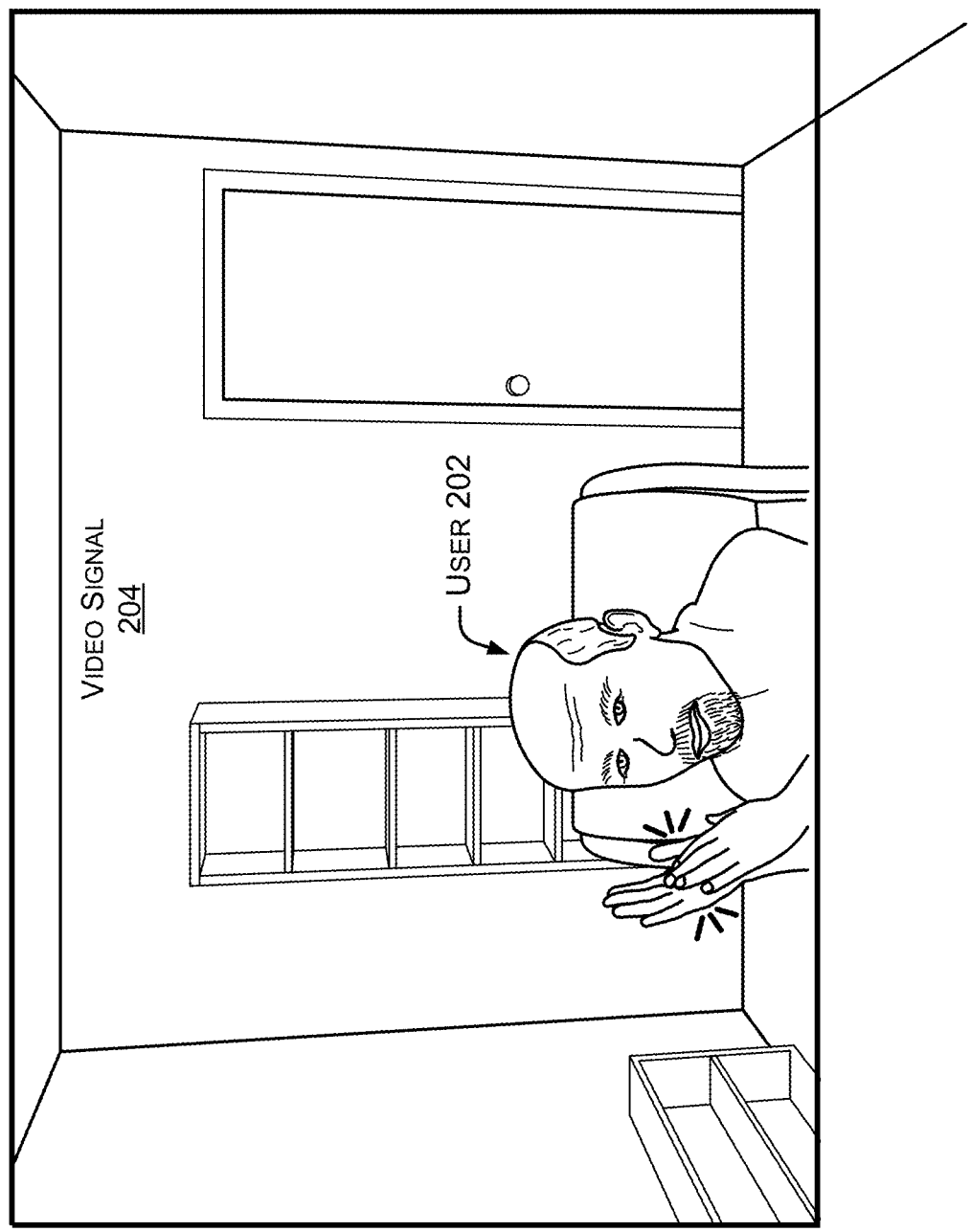

ADAPTIVE ENHANCEMENT OF AUDIO OR VIDEO SIGNALS

BACKGROUND

One important use case for computing devices involves teleconferencing, where participants communicate with remote users via audio and/or video over a network. Often, audio signals for a given teleconference can include impairments such as device distortion, echoes, reverberation, and/ or noise. In some cases, audio enhancement to remove impairments can be performed by a centralized or distributed model, but there are various drawbacks to these approaches that are described in more detail below.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The description generally relates to techniques for adaptive enhancement of audio or video signals. One example includes a method or technique that can be performed on a computing device. The method or technique can include obtaining a microphone signal captured by a first device participating in a call with a second device. The method or technique can also include performing first enhancement processing of the microphone signal to obtain a first enhanced microphone signal. The first enhancement processing can be adapted to suppress a designated sound and one or more other sounds. The method or technique can also include detecting the presence of the designated sound using the microphone signal or a video signal captured by the first device. The method or technique can also include, responsive to detecting the presence of the designated sound, performing second enhancement processing of the microphone signal to obtain a second enhanced microphone signal, the second enhancement processing being adapted to suppress the one or more other sounds and retain the designated sound. The method or technique can also include sending a playback signal to the second device that is participating in the call with the first device, the playback signal including the first enhanced microphone signal or the second enhanced microphone signal.

Another example includes a system having a hardware processing unit and a storage resource storing computer-readable instructions. When executed by the hardware processing unit, the computer-readable instructions can cause the system to obtain a microphone signal captured by a first device participating in a call with a second device. The computer-readable instructions can also cause the system to detect the presence of the designated sound using the microphone signal or a video signal captured by the first device. The computer-readable instructions can also cause the system to perform first enhancement processing of the microphone signal to obtain a first enhanced microphone signal. The first enhancement processing adapted to suppress a designated sound and one or more other sounds. The computer-readable instructions can also cause the system to, responsive to detecting the presence of the designated sound, perform second enhancement processing of the microphone signal to obtain a second enhanced microphone signal. The second enhancement processing being adapted to suppress the one or more other sounds and retain the designated sound. The computer-readable instructions can also cause the system to send a playback signal to the second device that is participating in the call with the first device, the playback signal including the first enhanced microphone signal or the second enhanced microphone signal.

Another example includes a computer-readable storage medium storing executable instructions. When executed by a processor, the executable instructions can cause a processor to perform acts. The acts can include obtaining a microphone signal captured by a first device participating in a call with a second device. The acts can also include detecting the presence of a designated sound using the microphone signal or a video signal captured by the first device. The acts can also include enhancing the microphone signal by suppressing the designated sound and one or more other sounds to obtain an enhanced microphone signal. The acts can also include, responsive to detecting the designated sound, adding a graphical indicator that conveys the designated sound to the video signal. The acts can also include sending the playback signal to the second device that is participating in the call with the first device. The playback signal can include the enhanced microphone signal and the video signal having the graphical indicator.

The above-listed examples are intended to provide a quick reference to aid the reader and are not intended to define the scope of the concepts described herein.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items.

FIG. 2A-2E illustrate an example teleconferencing scenario with a single user that claps during a call consistent with some implementations of the present concepts.

DETAILED DESCRIPTION

Overview

Figure 1:
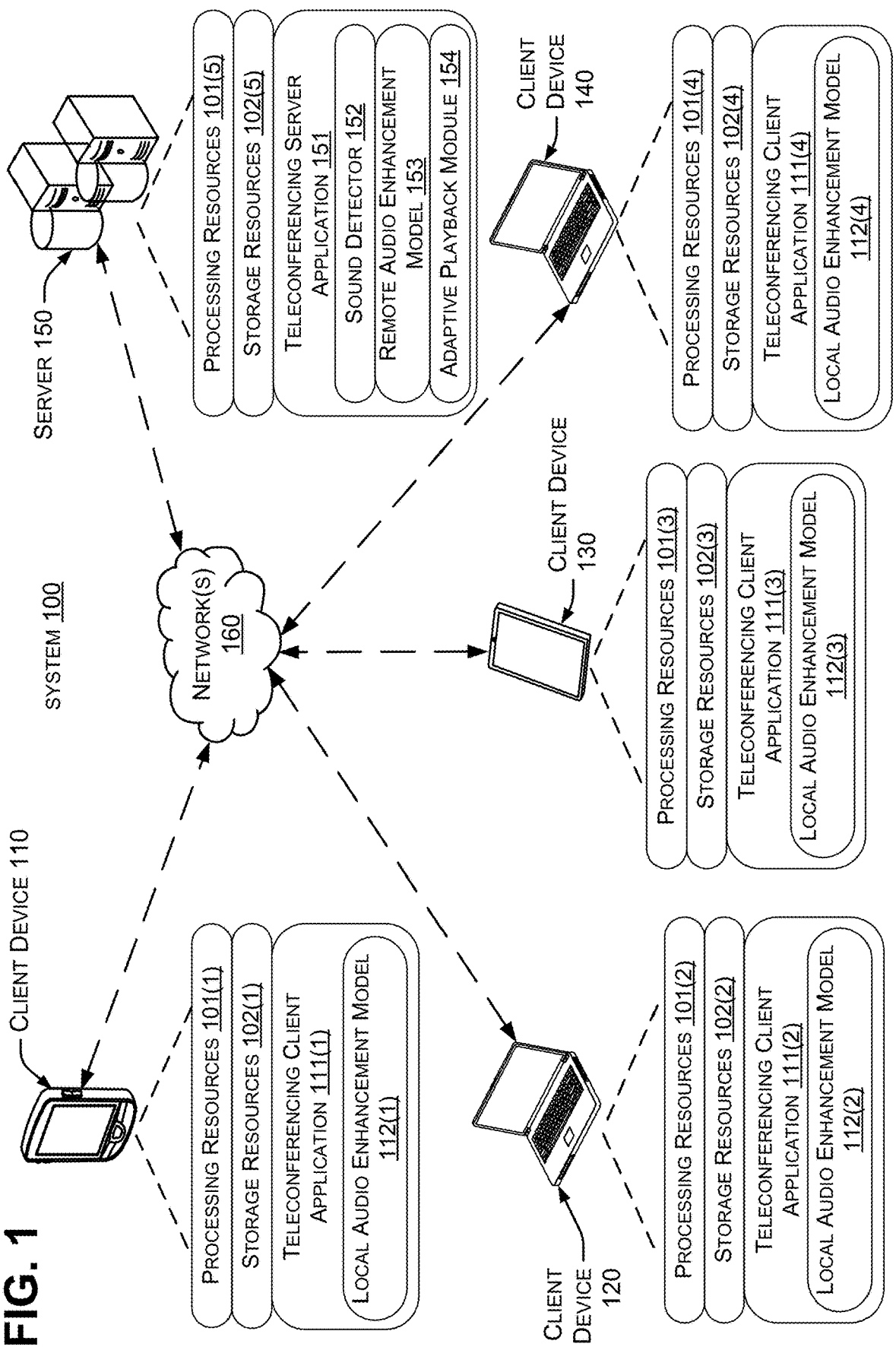
FIG. 1 illustrates an example system, consistent with some implementations of the present concepts.

The disclosed implementations generally offer techniques for enabling high-quality audio or video for teleconferences. As noted previously, conventional teleconferencing solutions often employ enhancement models to remove unwanted impairments such as echoes and/or noise from audio signals during a call. For instance, one type of impairment is audio noise that can be present during a teleconference. By enhancing audio to suppress noises such as fans humming, dogs barking, or doors slamming, an audio enhancement model can create a much better audio experience for participants in a teleconference. However, enhancement models that suppress unwanted noise may also suppress other sounds in a manner that creates confusing experiences for call participants.

Consider a scenario where a remote user is watching a group of participants in a call give a round of applause to a speaker by clapping their hands. A noise suppressor may remove the clapping sounds, but the video feed will still show the clapping actions to the remote user. The remote user may find it strange to see the users clapping their hands in the video feed yet not hear the clapping in the noise-suppressed audio signal.

More generally, there are other scenarios where audio enhancement models tend to suppress sounds in a manner that can create a confusing experience. For instance, consider a person in a video that is explaining how to make a smoothie, and turns on a blender while demonstrating how to do so. Typically, a noise suppressor would remove the sound of the blender, but in this scenario, it could be useful to allow the noise from the blender to pass through the noise suppressor.

The disclosed implementations can overcome these deficiencies of prior techniques by employing adaptive audio enhancement. For example, in some cases, sounds that would normally be suppressed by an audio enhancement model can be allowed to pass through the model. In other cases, graphical indicators can be used to convey that a given sound source is present in a video signal, so that participants are aware of the sound source even if the sound source has been suppressed by audio enhancement.

Definitions

For the purposes of this document, the term "signal" refers to a function that varies over time or space. A signal can be represented digitally using data samples, such as audio samples, video samples, or one or more pixels of an image. A "classification model" can classify signals by detecting sounds or sound sources. For instance, an audio classification model could process a microphone signal to detect clapping sounds, dog barking sounds, blender sounds, etc. A video classification model could process a video signal to detect sound sources such as a user making a clapping gesture, a dog, or a blender. The presence of a designated sound can be detected in an audio signal by classifying the audio signal to identify the designated sound. The presence of a designated sound can also be detected in a video signal by classifying an object in the video as a source of the designated sound. For instance, a video signal captured by a first device could be processed to detect a clapping gesture by a human being, and this implies the presence of a clapping noise in a microphone signal captured by the first device.

An "enhancement model" refers to a model that performs enhancement processing, e.g., processes data samples from an input signal to enhance the perceived quality of the signal. For instance, an enhancement model could remove noise or echoes from audio data, or could sharpen image or video data. The term "personalized enhancement model" refers to an enhancement model that has been adapted to enhance data samples specifically for a given user. For instance, as discussed more below, a personalized data enhancement model could be adapted to filter out noise, echoes, etc., to isolate particular user's voice by attenuating components of an audio signal produced by other sound sources. An enhancement model can "suppress" a sound by reducing the volume of the sound sufficiently that the sound is inaudible or barely audible to a human being. For instance, in the case of clapping, the clapping sound can be reduced to noise floor, e.g., an 80 dB clapping noise can be reduced by 40 dB when there is 40 dB of background noise. An enhancement model can "retain" a sound by either not reducing the volume of the sound or slightly reducing the volume of the sound so that the sound is still clearly audible to human beings.

The term "mixing," as used herein, refers to combining two or more signals to produce another signal. Mixing can include adding two audio signals together, interleaving individual audio signals in different time slices, adding video signals and audio signals together to create a playback signal, etc. In some cases, audio signals from two co-located devices can be mixed to obtain a playback signal. The term "synchronizing" means aligning two or more signals, e.g., prior to mixing. For instance, two or more microphone signals can be synchronized by identifying corresponding frames in the respective signals and temporally aligning those frames. Likewise, loudspeakers can also be synchronized by identifying and temporally aligning corresponding frames in sounds played back by the loudspeakers. In addition, audio signals can be synchronized to video signals.

The term "co-located," as used herein, means that two devices have been determined to be within proximity to one another according to some criteria, e.g., the devices are within the same room, within a threshold distance of one another, etc. The term "playback signal," as used herein, refers to a signal that can be played back by a loudspeaker, a display, etc. A playback signal can be a combination of one or more microphone signals and one or more video signals. An "enhanced" signal is a signal that has been processed using an enhancement model to improve some signal characteristic of the signal.

The term "signal characteristic" describes how a signal can be perceived by a user, e.g., the overall quality of the signal or a specific aspect of the signal such as how noisy an audio signal is, how blurry an image signal is, etc. The term "quality estimation model" refers to a model that evaluates an input signal to estimate how a human might rate the perceived quality of the input signal for one or more signal characteristics. For example, a first quality estimation model could estimate the speech quality of an audio signal and a second quality estimation model could estimate the overall quality and/or background noise of the same audio signal. Audio quality estimation models can be used to estimate signal characteristics of an unprocessed or raw audio signal or a processed audio signal that has been output by a particular data enhancement model. The output of a quality estimation model can be a synthetic label representing the signal quality of a particular signal characteristic. Here, the term "synthetic label" means a label generated by a machine evaluation of a signal, where a "manual" label is provided by human evaluation of a signal.

The term "model" is used generally herein to refer to a range of processing techniques, and includes models trained using machine learning as well as hand-coded (e.g., heuristic-based) models. For instance, a machine-learning model could be a neural network, a support vector machine, a decision tree, etc. Whether machine-trained or not, data enhancement models can be configured to enhance or otherwise manipulate signals to produce processed signals. Data enhancement models can include codecs or other compression mechanisms, audio noise suppressors, echo removers, distortion removers, image/video healers, low light enhancers, image/video sharpeners, image/video denoisers, etc., as discussed more below.

The term "impairment," as used herein, refers to any characteristic of a signal that reduces the perceived quality of that signal. Thus, for instance, an impairment can include noise or echoes that occur when recording an audio signal, or blur or low-light conditions for images or video. One type of impairment is an artifact, which can be introduced by a data enhancement model when removing impairments from a given signal. Viewed from one perspective, an artifact can be an impairment that is introduced by processing an input signal to remove other impairments. Another type of impairment is a recording device impairment introduced into a raw input signal by a recording device such a microphone or camera. Another type of impairment is a capture condition impairment introduced by conditions under which a raw input signal is captured, e.g., room reverberation for audio, low light conditions for image/video, etc.

The following discussion also mentions audio devices such as microphones and loudspeakers. Note that a microphone that provides a microphone signal to a computing device can be an integrated component of that device (e.g., included in a device housing) or can be an external microphone in wired or wireless communication with that computing device. Similarly, when a computing device plays back a signal over a loudspeaker, that loudspeaker can be an integrated component of the computing device or in wired or wireless communication with the computing device. In the case of a wired or wireless headset, a microphone and one or more loudspeakers can be integrated into a single peripheral device that sends microphone signals to a corresponding computing device and outputs a playback signal received from the computing device.

Machine Learning Overview

There are various types of machine learning frameworks that can be trained to perform a given task, such as detecting sounds in microphone signals, detecting sound sources in video signals, enhancing video or audio signals, etc. Support vector machines, decision trees, and neural networks are just a few examples of machine learning frameworks that have been used in a wide variety of applications, such as image processing and natural language processing. Some machine learning frameworks, such as neural networks, use layers of nodes that perform specific operations.

In a neural network, nodes are connected to one another via one or more edges. A neural network can include an input layer, an output layer, and one or more intermediate layers. Individual nodes can process their respective inputs according to a predefined function, and provide an output to a subsequent layer, or, in some cases, a previous layer. The inputs to a given node can be multiplied by a corresponding weight value for an edge between the input and the node. In addition, nodes can have individual bias values that are also used to produce outputs. Various training procedures can be applied to learn the edge weights and/or bias values. The term "internal parameters" is used herein to refer to learnable values such as edge weights and bias values that can be learned by training a machine learning model, such as a neural network. The term "hyperparameters" is used herein to refer to characteristics of model training, such as learning rate, batch size, number of training epochs, number of hidden layers, activation functions, etc.

A neural network structure can have different layers that perform different specific functions. For example, one or more layers of nodes can collectively perform a specific operation, such as pooling, encoding, or convolution operations. For the purposes of this document, the term "layer" refers to a group of nodes that share inputs and outputs, e.g., to or from external sources or other layers in the network. The term "operation" refers to a function that can be performed by one or more layers of nodes. The term "model structure" refers to an overall architecture of a layered model, including the number of layers, the connectivity of the layers, and the type of operations performed by individual layers. The term "neural network structure" refers to the model structure of a neural network. The term "trained model" and/or "tuned model" refers to a model structure together with internal parameters for the model structure that have been trained or tuned. Note that two trained models can share the same model structure and yet have different values for the internal parameters, e.g., if the two models are trained on different training data or if there are underlying stochastic processes in the training process.

EXAMPLE SYSTEM

The present implementations can be performed in various scenarios on various devices. FIG. 1 shows an example system 100 in which the present implementations can be employed, as discussed more below.

As shown in FIG. 1, system 100 includes a client device 110, a client device 120, a client device 130, a client device 140, and a server 150, connected by one or more network(s) 160. Note that the client devices can be embodied as mobile devices such as smart phones, laptops, or tablets, as well as stationary devices such as desktops, server devices, etc. Likewise, servers can be implemented using various types of computing devices. In some cases, any of the devices shown in FIG. 1, but particularly the servers, can be implemented in data centers, server farms, etc.

Certain components of the devices shown in FIG. 1 may be referred to herein by parenthetical reference numbers. For the purposes of the following description, the parenthetical (1) indicates an occurrence of a given component on client device 110, (2) indicates an occurrence of a given component on client device 120, (3) indicates an occurrence of a given component on client device 130, (4) indicates an occurrence of a given component on client device 140, and (5) indicates an occurrence on server 150. Unless identifying a specific instance of a given component, this document will refer generally to the components without the parenthetical.

Generally, the devices 110, 120, 130, 140, and/or 150 may have respective processing resources 101 and storage resources 102, which are discussed in more detail below. The devices may also have various modules that function using the processing and storage resources to perform the techniques discussed herein. The storage resources can include both persistent storage resources, such as magnetic or solid-state drives, and volatile storage, such as one or more random-access memory devices. In some cases, the modules are provided as executable instructions that are stored on persistent storage devices, loaded into the random-access memory devices, and read from the random-access memory by the processing resources for execution.

Client devices 110, 120, 130, and/or 140 can include respective instances of a teleconferencing client application 111. The teleconferencing client application can provide functionality for allowing users of the client devices to conduct audio teleconferencing with one another, with and/or without video functionality. In some cases, the teleconferencing client application can include a local audio enhancement model 112.

Teleconferencing server application 151 on server 150 can coordinate calls among the individual client devices by communicating with the respective instances of the teleconferencing client application 111 over network 160. For instance, the teleconferencing server application can have a sound detector 152 that detects sounds in audio signals or sound sources in video signals received from the respective client devices. The teleconferencing server application can also have a remote audio enhancement model 153 that can enhance received microphone signals. The teleconferencing server application can also have an adaptive playback module 154 that synchronizes and/or mixes individual microphone signals from the respective client devices to obtain one or more playback signals, and communicates the playback signals to one or more remote client devices during a call. For video conferencing scenarios, the adaptive playback module can also mix video signals together with the audio signals and communicate the mixed video/audio playback signals to participants in a call.

As discussed more below, playback signals can be provided in an adaptive manner that allows specific sounds to pass through without being suppressed by audio enhancement. For instance, the adaptive playback module can control the local or remote audio enhancement models to allow specific sounds to pass through that would otherwise be suppressed. As another example, the adaptive playback module can incorporate graphical indicators into video signals to indicate when specific sound sources are present with a given participant in a call.

Audio enhancement models can be adapted for many users. Indenbom, et al., (2022), *Deep model with built-in self-attention alignment for acoustic echo cancellation*, arXiv preprint arXiv:2208.11308. Alternatively, audio enhancement models can be personalized to individual users. Eskimez, et al., (2022, May), *Personalized speech enhancement: New models and comprehensive evaluation*, In ICASSP 2022-2022 IEEE International Conference on Acoustics, Speech and Signal Processing (ICASSP) (pp. 356-360) IEEE. U.S. patent application Ser. No. 17/848,674, filed Jun. 24, 2022, also describes approaches for personalized audio enhancement, and is incorporated herein by reference in its entirety.

Personalized or non-personalized audio enhancement models can be used for enhancement processing. In some cases, two different audio enhancement models are employed—a first model that has been trained using training targets that lack a designated sound, such as clapping, and a second model that has been trained using training targets that include the designated sound. For instance, the first model can be trained by inputting noisy audio signals that include dogs barking, clapping, and fan noises to the first model, and encouraging the model to produce clean target signals that lack dogs barking, clapping, and fan noises. The second model can be trained by inputting noisy audio signals that include dogs barking, clapping, and fan noises to the first model, and encouraging the model to produce clean target signals that lack dogs barking and fan noises, but include clapping.

Example Call Scenario

FIG. 2A-2E illustrate scenarios where adaptive audio enhancement is performed. For the purposes of the following example, assume that local audio enhancement is not enabled on the client devices 110, 120, 130, and 140, and remote audio enhancement is enabled on the server 150.

Figure 2B:
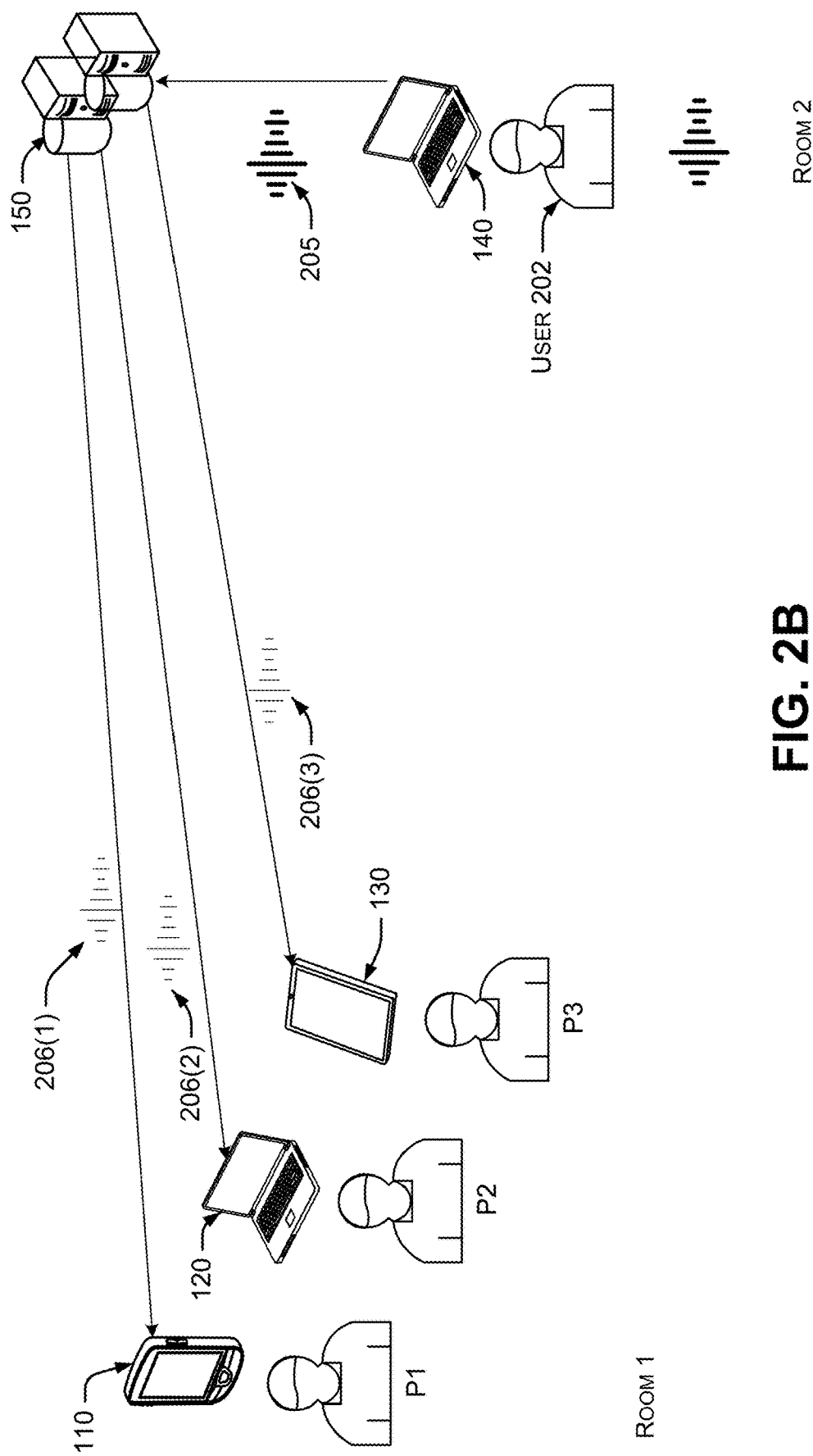

FIG. 2A shows a user 202 clapping during a call, which appears in video signal 204. FIG. 2B shows a scenario where user 202 is using client device 140 in room 2, located remotely from users P1, P2, and P3 in room 1, using client devices 110, 120, and 130, respectively. The microphone of client device 140 picks up microphone signal 205 when user 202 claps in room 2. Microphone signal 205 is sent to the server 150, which suppresses the sound of the clap, resulting in enhanced audio signals 206(1), 206(2), and 206(3), which are sent to client devices 110, 120, and 130 respectively. Thus, users P1, P2, and P3 see user 202 clapping but the clapping sound is suppressed to be inaudible or barely audible.

Figure 2C:
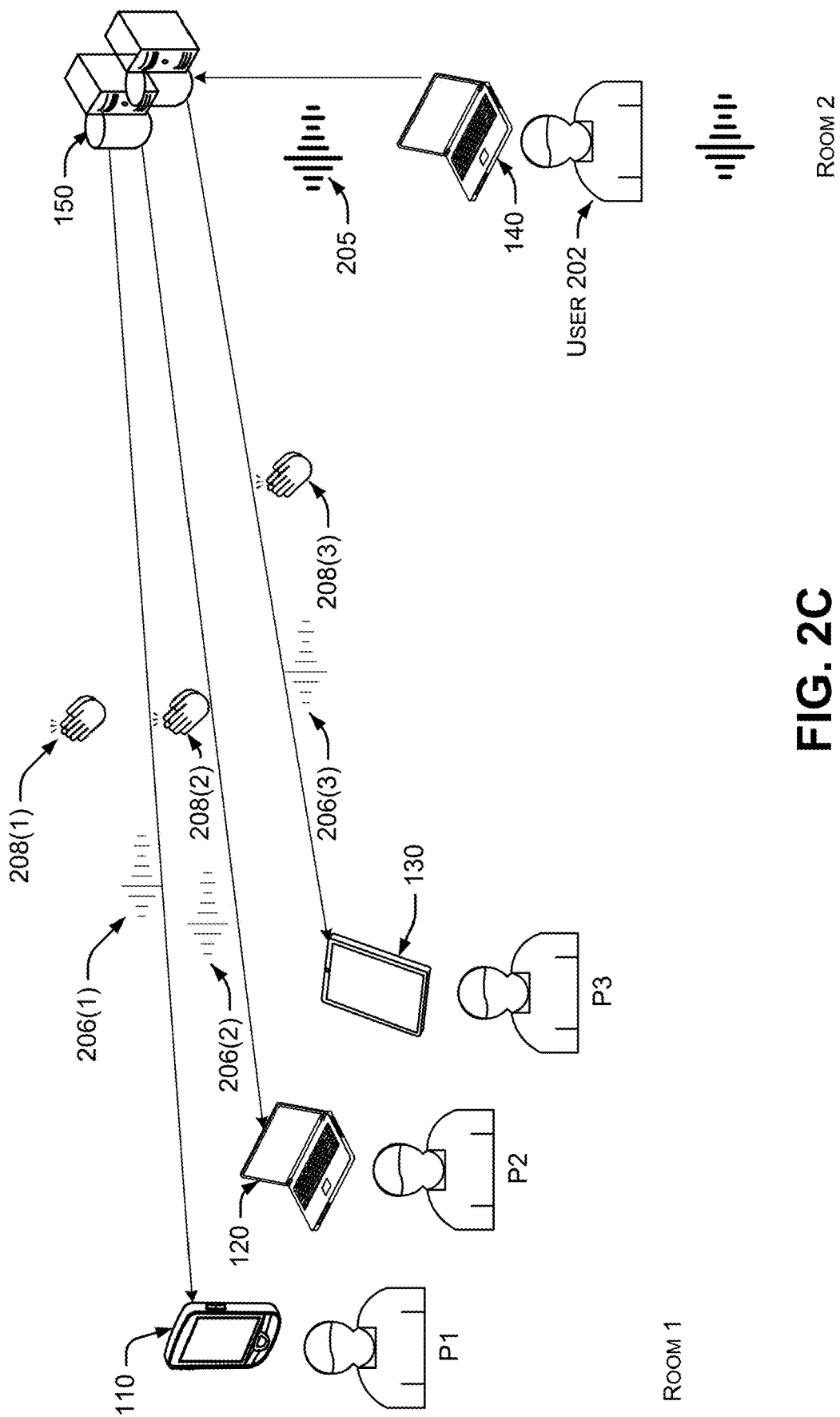

FIG. 2C shows a scenario similar to that shown in FIG. 2B. Again, server 150 suppresses the sound of the clap, resulting in enhanced audio signals 206(1), 206(2), and 206(3), which are sent to client devices 110, 120, and 130 respectively, again with suppressed clapping sounds. However, in this case, the server detects the presence of clapping in at least one of microphone signal 205 or a video signal captured by client device 140, and adds clapping emojis 208(1), 208(2), and 208(3) to the video signal for playback on the respective client devices 110, 120, and 130. Thus, while users P1, P2, and P3 may not hear any clapping sounds, the clapping emojis convey the actions of user 202 visually.

Figure 2D:
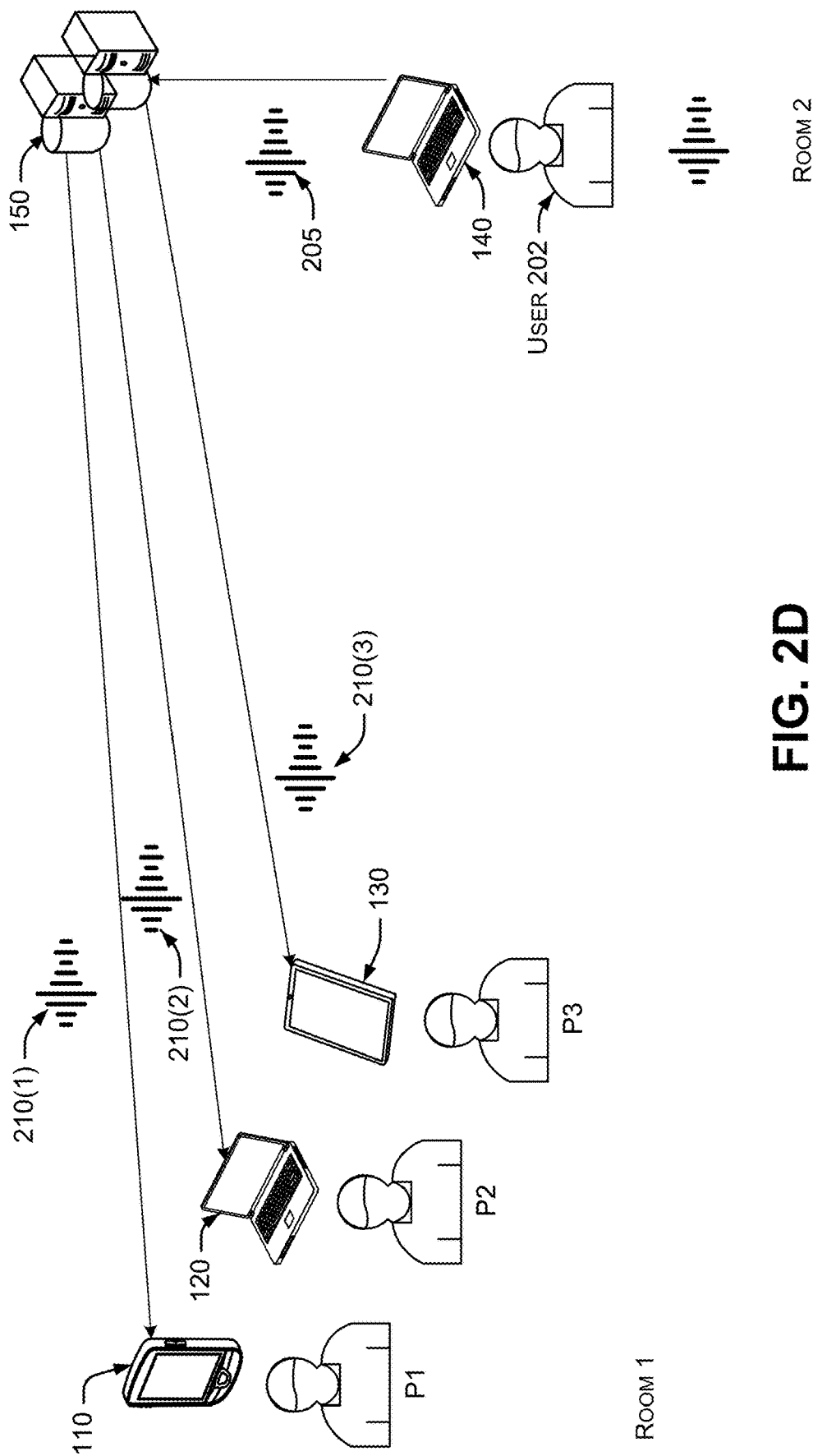

FIG. 2D shows a scenario similar to that shown in FIG. 2B. However, in this scenario, when server 150 detects the presence of the clapping sound, the server enhances the signal while retaining the clapping sound, resulting in enhanced audio signals 210(1), 210(2), and 210(3), which are sent to client devices 110, 120, and 130 respectively. Thus, users P1, P2, and P3 can hear user 202 clapping.

Figure 2E:
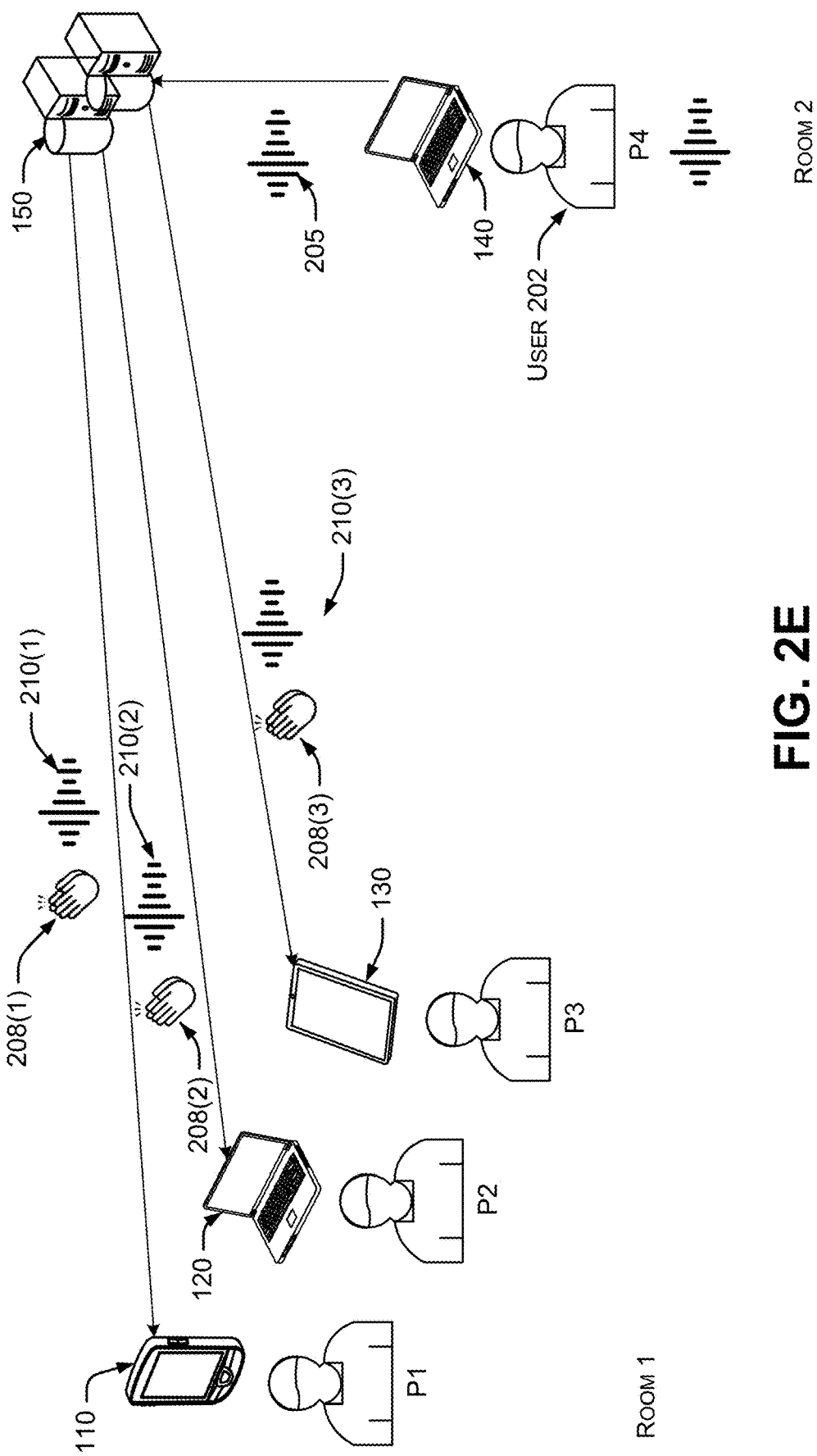

FIG. 2E shows a scenario similar to that shown in FIG. 2B. However, in this scenario, when the server 150 detects the presence of the clapping sound, the server enhances the signal while retaining the clapping sound, resulting in enhanced audio signals 210(1), 210(2), and 210(3), which are sent to client devices 110, 120, and 130 respectively. In addition, the server also adds clap emojis 208(1), 208(2), and 208(3) to a video signal for playback on the respective client devices 110, 120, and 130. Thus, users P1, P2, and P3 can hear the clapping sounds and also see the graphical indicator conveying that user 202 is clapping.

Multiple Speaker User Experience

Figure 3:
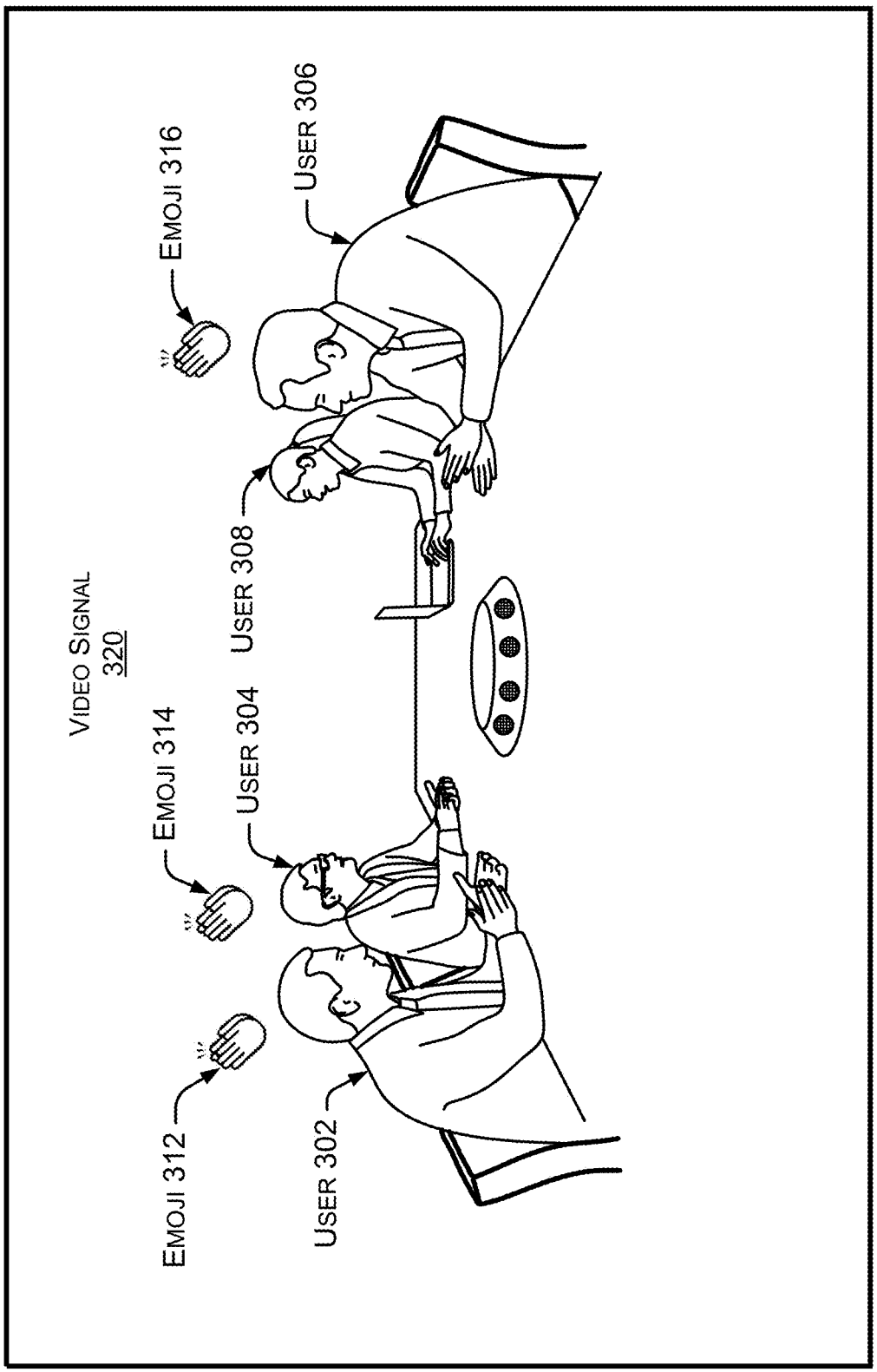
FIG. 3 illustrates an example teleconferencing scenario with multiple users that clap during a call, consistent with some implementations of the present concepts.

FIG. 3 shows an example where three users 302, 304, and 306 are clapping while a fourth user 308 is not clapping, and all four users are co-located. Corresponding clapping emojis 312, 314, and 316 are added above the clapping users, resulting in video signal 320. Thus, in this example, participants in a call with users 302, 304, 306, and 308 can tell which users are clapping via the visual indication. In some cases, the video signal can be accompanied by an audio signal that has been enhanced to suppress clapping noises. In other cases, the video signal can be accompanied by an audio signal that has been enhanced to retain the clapping noises.

Example Audio-Based Detection Architecture

Figure 4A:
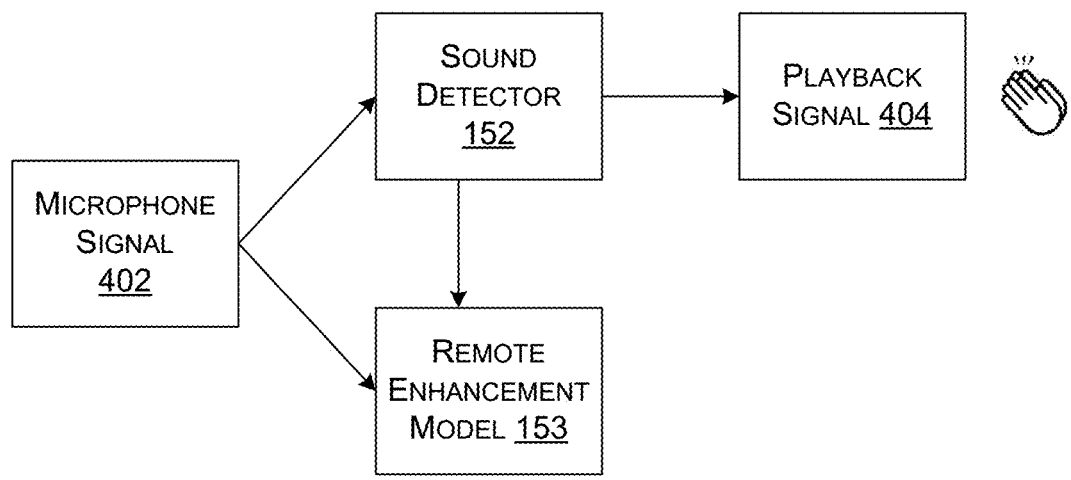
FIG. 4A illustrates an example architecture for detecting a designated sound using a microphone signal, consistent with some implementations of the present concepts.

FIG. 4A shows an architecture 400. A microphone signal 402 is provided to sound detector 152 and remote audio enhancement model 153 (See FIG. 1). When a designated sound is detected in the microphone signal, a playback signal 404 is generated that (a) includes a video signal with graphical indicator that conveys the designated sound as shown in FIG. 2C, (b) includes the designated sound as shown in FIG. 2D, or (c) includes both the graphical indicator and the designated sound as shown in FIG. 2E.

Example Audio and Video-Based Detection Architecture

Figure 4B:
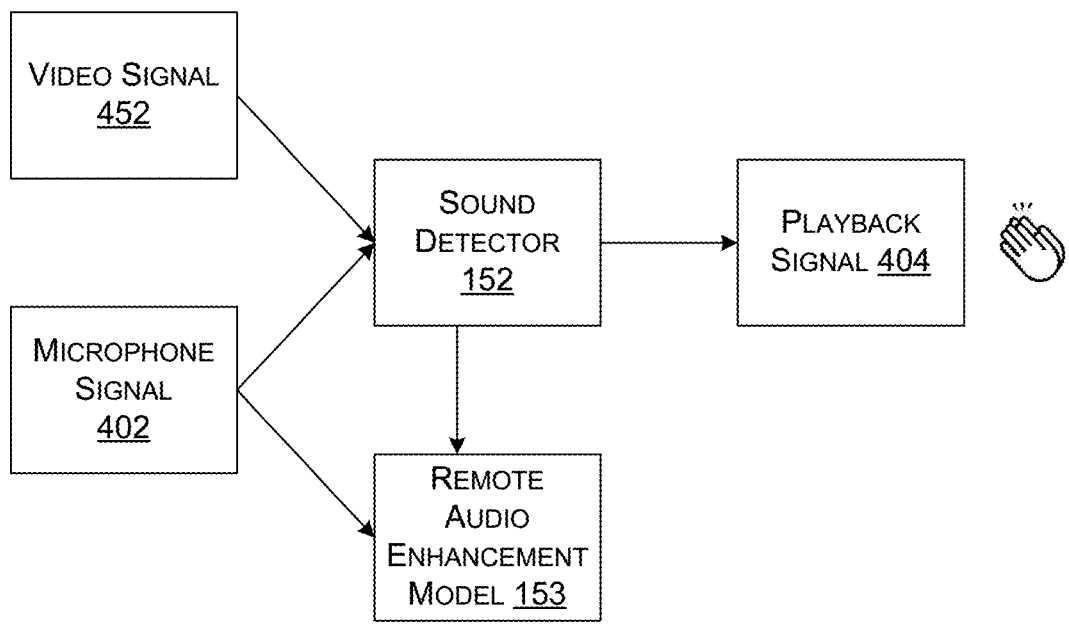
FIG. 4B illustrates an example architecture for detecting a designated sound using a microphone signal and a video signal, consistent with some implementations of the present concepts.

FIG. 4B shows an architecture 450. A microphone signal 402 and a video signal 452 are provided to sound detector 152. The microphone signal is also provided to remote audio enhancement model 153 (See FIG. 1). When a designated sound is detected in the microphone signal, a playback signal 404 is generated that (a) includes a graphical indicator that conveys the designated sound as shown in FIG. 2C, (b) includes the designated sound as shown in FIG. 2D, or (c) includes both the graphical indicator and the designated sound as shown in FIG. 2E. Note that in some cases (not shown), video only can be employed to detect the presence of a particular sound.

Example Combined Model

Figure 5:
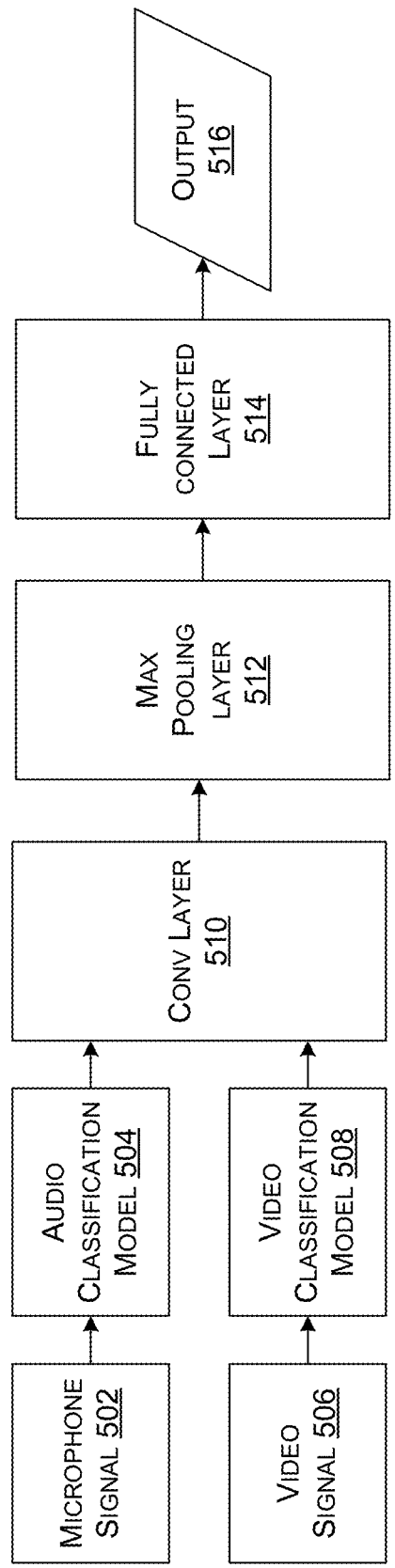
FIG. 5 illustrates an example combined model for detecting a designated sound using a microphone and a camera, consistent with some implementations of the present concepts.

FIG. 5 shows an example combined detection model 500 that can be employed by the sound detector 152. A microphone signal 502 is provided to an audio classification model 504. A video signal 506 is provided to a video classification model 508. Outputs of the audio and video classification models are provided to a convolutional layer 510. Output of the convolutional layer is provided to a max pooling layer 512. Output of the max pooling layer is provided to a fully-connected layer 514. The fully-connected layer produces an output 516 that conveys whether a particular sound source is detected in the audio and/or video.

One example audio classification model is MusicNet, Reddy, et al., (2021), *MusicNet: Compact Convolutional Neural Network for Real—time Background Music Detection, arXiv preprint arXiv:*2110.04331. MusicNet can be obtained as a pretrained audio classification model that is adapted to detect sounds such as music. One example video classification model is SlowFast, Feichtenhofer, et al., (2019), *Slowfast networks for video recognition*, In Proceedings of the IEEE/CVF international conference on computer vision (pp. 6202-6211). MusicNet can be obtained as a pretrained video classification model that is adapted to detect various gestures, but not necessarily a clapping gesture.

One way to obtain combined detection model 500 is to perform a transfer learning approach. First, weights of audio classification model 504 and video classification model 508 can be fixed. Then, one or more layers of each model can be removed, such as layers of the audio classification model that classify sounds as music or not based on inputs from preceding layers, or layers of the video classification model that classify gestures based on inputs from preceding layers. Then, new layers such as convolution layer 510, max pooling layer 512, and fully-connected layer 514 can be added to the remaining layers of the audio and video classification models. Subsequently, the added layers can be trained using audio signals that have labels indicating whether they include a designated sound (e.g., clapping) and video signals that have labels indicating whether they include a particular gesture that produces the sound (e.g., a clapping gesture). Using this approach, the combined detection model can leverage knowledge that was previously learned when the audio and video classification models were pretrained, because this knowledge is preserved in the weights of the retained layers. Note that in some cases, additional tuning of the weights of the retained layers can also be performed, e.g., after fixing these weights for a number of iterations.

Example Spectrogram

Figure 6:
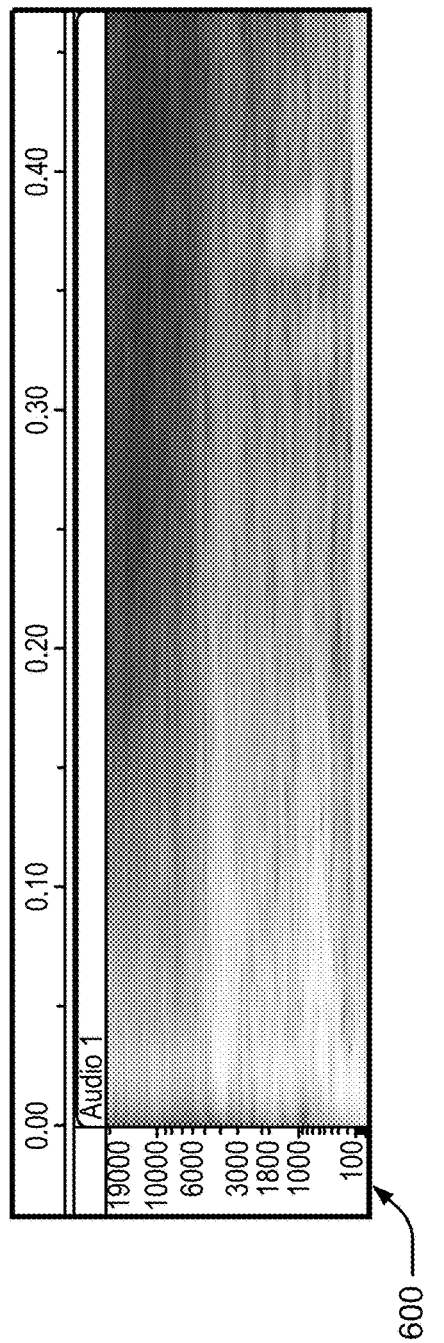
FIG. 6 illustrates spectrograms of a clapping sound, consistent with some implementations of the present concepts.
Figure 6:
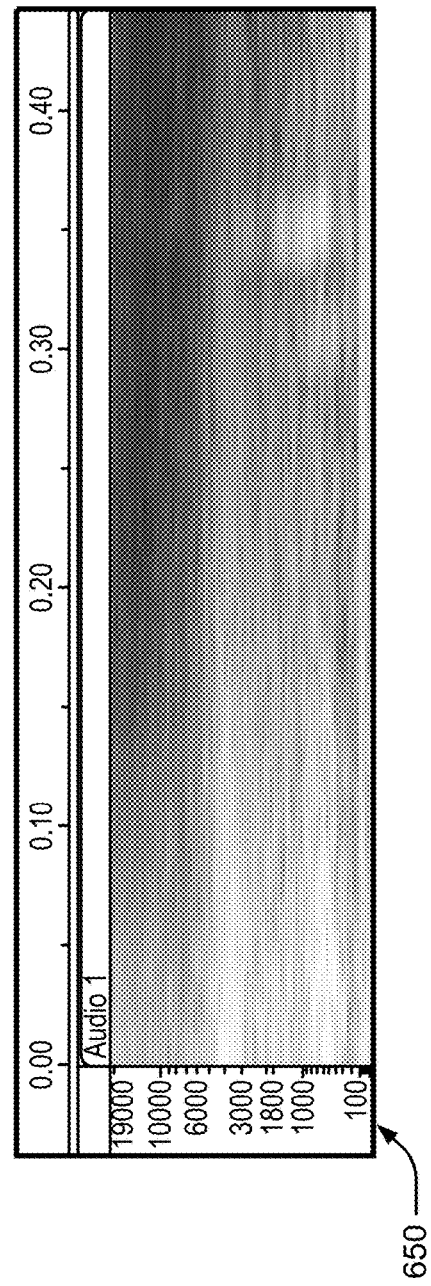

FIG. 6 shows a full spectrogram 600 of a clapping sound and a shifted spectrogram 650 of the same clapping sound. Shifted spectrogram 650 is shifted 20 milliseconds later in time relative to full spectrogram 600. Although the initial peak impulse of the clapping sound occurs in the first 20 milliseconds and is not present in shifted spectrogram 650, humans still perceive a detectable clapping sound even without the first 20 milliseconds of the audio signal.

Thus, in some implementations, the first 20 milliseconds of a microphone signal can be employed to detect clapping noises. In some implementations, a video model can be employed to detect a contemporaneous clapping gesture. Once the clapping gesture is detected in the video signal, the remaining microphone signal can be processed to retain the clapping sound, effectively sounding as if no claps are missing. Generally speaking, the use of video classification to detect clapping can allow clapping to be detected more quickly than using audio-only approaches. When only an audio classification model is used to detect clapping, two or more claps may be used to confirm the presence of clapping, and thus those initial claps may be missing from the enhanced audio signal.

Alternative Designated Sounds

One way to determine which sounds are designated for adaptive enhancement involves receiving user input to configure a given sound. For instance, a user could set up their own teleconferencing client application to suppress noises other than clapping and music, which the user designates as sounds to be retained. In other cases, however, real-time analysis of video signals can be employed to determine which designated sounds are used for adaptive enhancement.

Figure 7:
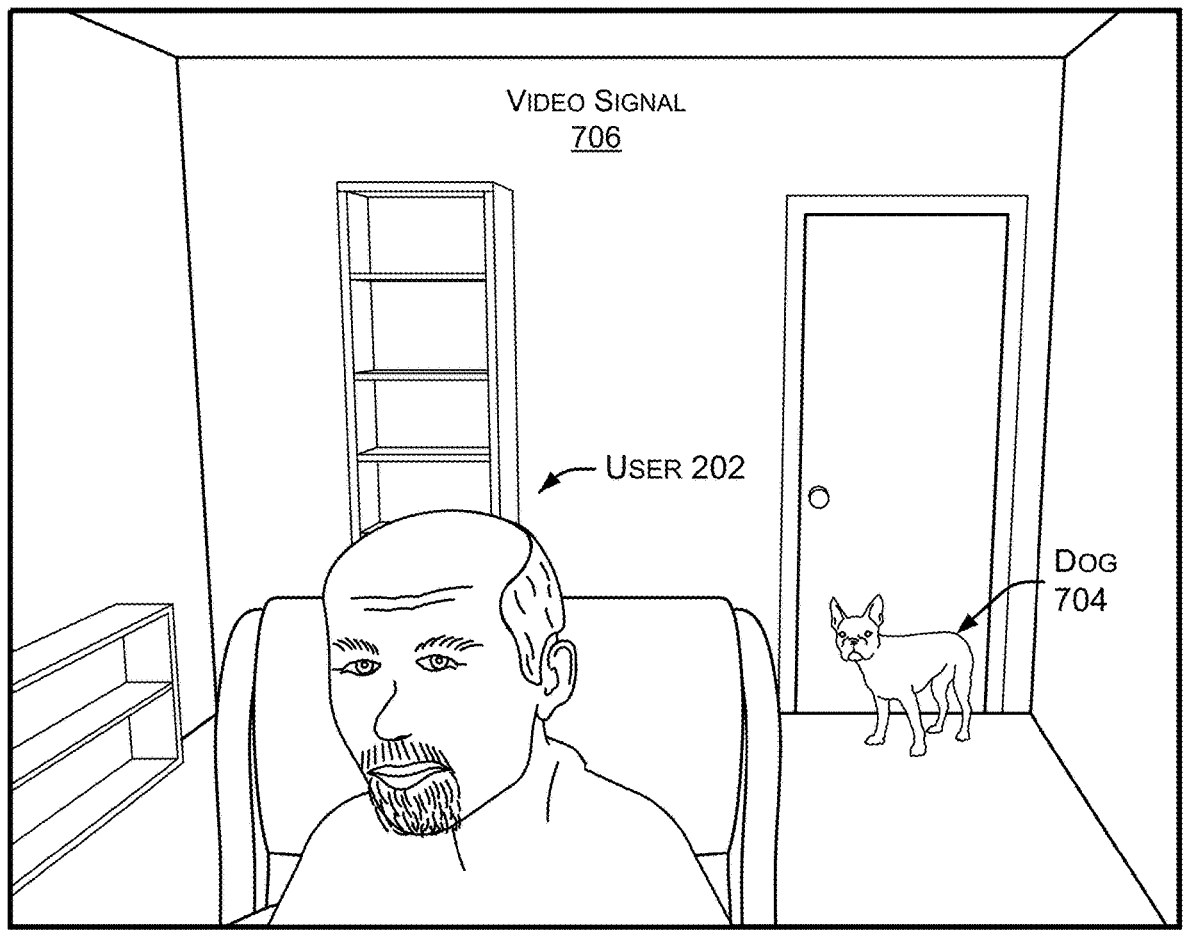
FIG. 7 illustrates a sound source of a designated sound that appears in a video signal, consistent with some implementations of the present concepts.

FIG. 7 shows a user 202 and dog 704 that appear in a video signal 706. Here, an audio enhancement model that suppresses barking dog noises can be initially employed. When the dog 704 appears in the video signal, a different audio enhancement model can be selected that allows dog barking sounds to pass through.

More generally, when a given sound source is detected in a given video signal, sounds made by that sound source can be allowed to pass through. For instance, if a video signal initially shows a user in a kitchen with no blender in the field of view, an audio enhancement model that suppresses blender sounds can be employed. If a blender appears in the field of view, a different audio enhancement model can be selected that allows blender noises to pass through.

In some implementations, video classifications can be mapped to sounds. For instance, a dog detected in a video can be mapped to a barking sound from a noise ontology, an ambulance detected in a video can be mapped to a siren sound from a noise ontology, a closing door detected in a video can be mapped to a door shutting noise, and so on. Thus, as different objects appear in a given video signal, the matching sounds from the sound ontology can be selectively retained, and when those objects disappear from the video signal, the matching sounds can be selectively suppressed. As a result, a user viewing the video signal will hear sounds from sound sources that are present in the video, without being distracted by confusing sounds from sound sources that are not present in the video.

Example Adaptive Audio Enhancement Method

Figure 8:
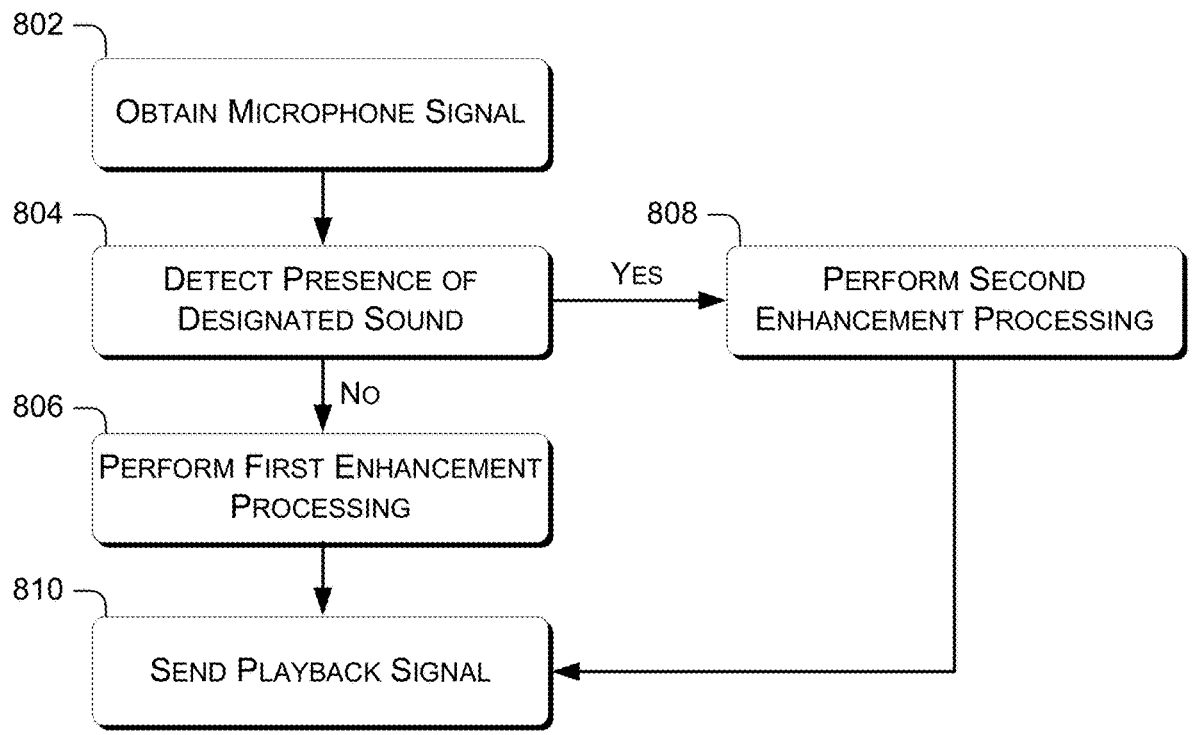
FIG. 8 illustrates an example method or technique for adaptive audio enhancement, consistent with some implementations of the disclosed techniques.

FIG. 8 illustrates an example method 800 for adaptive audio enhancement, consistent with some implementations of the present concepts. Method 800 can be implemented on many different types of devices, e.g., by one or more cloud servers, by a client device such as a laptop, tablet, or smartphone, or by combinations of one or more servers, client devices, etc.

Method 800 begins at block 802, where a microphone signal captured by a first device is obtained. For example, the microphone signal can be captured by a first device that is participating in a call with a second device.

Method 800 continues at block 804, where the presence of a designated sound is detected in the microphone signal or a video signal captured by the first device. For instance, the presence of the designated sound can be detected by an audio classification model that identifies the designated sound in the microphone signal. Alternatively or in addition, a sound source that produces the designated sound can be detected by a video classification model that identifies the sound source in the video signal.

When the presence of the designated sound is not detected, method 800 continues at block 806, where first enhancement processing of the microphone signal is performed to obtain a first enhanced microphone signal. For example, the first enhancement processing can be performed using a first audio enhancement model that is adapted to suppress a designated sound, such as clapping, and one or more other sounds, such as door slamming noises or fan noises. The first audio enhancement model can be, for example, a recurrent deep neural network with one or more convolutional layers. In some cases, the first audio enhancement model can receive a speaker embedding representing vocal characteristics of a speaker to perform personalized noise removal of sounds other than the voice of a particular speaker.

When the presence of the designated sound is detected, method 800 continues at block 808, where second enhancement processing of the microphone signal is performed to obtain a second enhanced microphone signal. For example, the second enhancement processing can be performed using a second audio enhancement model, which is adapted to suppress the one or more other sounds while retaining the designated sound. The second audio enhancement model can be, for example, a deep neural network with one or more convolutional layers. In some cases, the second audio enhancement model can receive a speaker embedding representing vocal characteristics of a speaker to perform personalized noise removal of sounds other than designated sounds and the voice of a particular speaker.

Method 800 continues from block 806 or block 808 to block 810, where a playback signal is sent to the second device. For instance, the second device can be a remote device that is located in a different room or building, and the playback signal can be sent to the second device over a network. In some cases, the playback signal can be sent to multiple remote devices, either co-located (e.g., together in a different room) or in different locations from one another. In some cases, block 810 can involve including a graphical identifier (such as a clapping emoji) in the video stream, which is provided as part of the playback signal. The playback signal can include either the first enhanced microphone signal (when the designated sound is not detected) or the second enhanced microphone signal (when the designated sound is detected).

In some cases, some or all of method 800 is performed by a remote server. In other cases, some or all of method 800 is performed by one of the co-located devices. For instance, the co-located devices can form a distributed peer-to-peer mesh where one of the co-located devices is selected to perform the method.

Example Adaptive Video Enhancement Method

Figure 9:
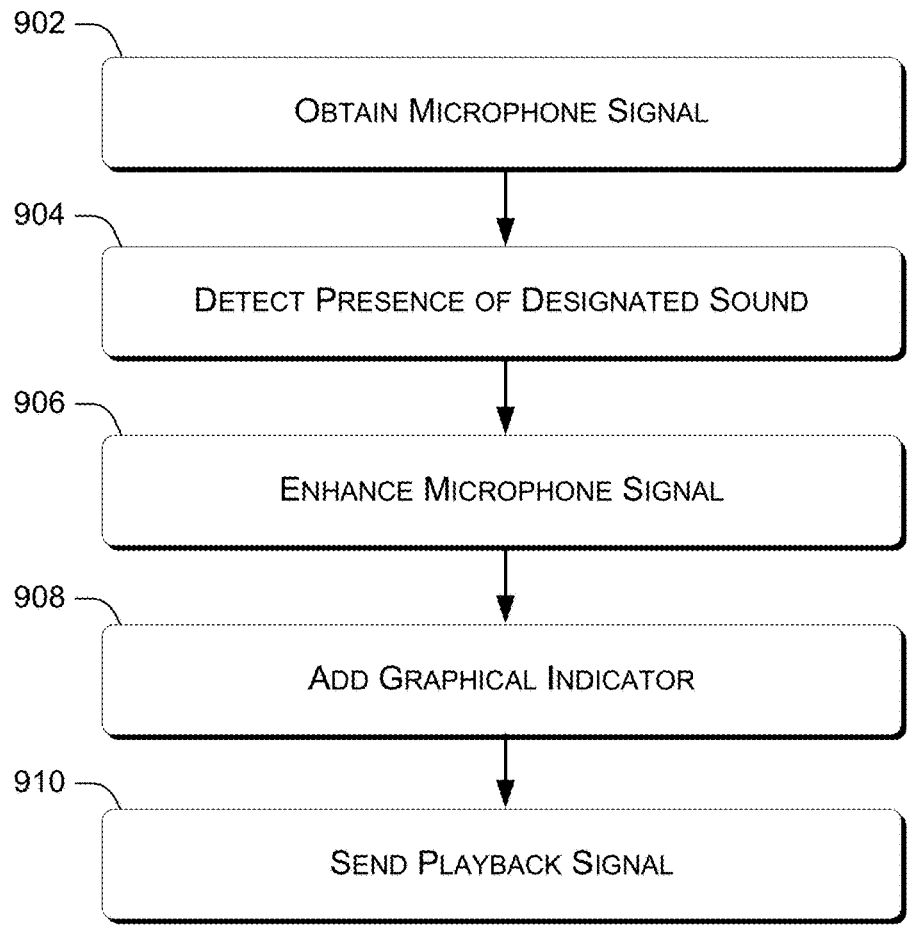
FIG. 9 illustrates an example method or technique for adaptive video enhancement, consistent with some implementations of the disclosed techniques.

FIG. 9 illustrates an example method 900 for adaptive audio enhancement, consistent with some implementations of the present concepts. Method 900 can be implemented on many different types of devices, e.g., by one or more cloud servers, by a client device such as a laptop, tablet, or smartphone, or by combinations of one or more servers, client devices, etc.

Method 900 begins at block 902, where a microphone signal captured by a first device is obtained. For example, the microphone signal can be captured by a first device that is participating in a call with a second device.

Method 900 continues at block 904, where the presence of a designated sound is detected in the microphone signal or a video signal captured by the first device. For instance, the presence of the designated sound can be detected by an audio classification model that identifies the designated sound in the microphone signal. Alternatively or in addition, a sound source that produces the designated sound can be detected by a video classification model that identifies the sound source in the video signal.

Method 900 continues at block 906, where the microphone signal is enhanced. For example, the enhancing can be performed using an audio enhancement model that is adapted to suppress the designated sound, such as clapping, and one or more other sounds, such as door slamming noises or fan noises.

Method 900 continues at block 908, where a graphical indicator of the designated sound is added to the video signal captured by the first device. The graphical indicator can convey the designated sound.

Method 900 continues at block 910, where a playback signal is sent to the second device. For instance, the second device can be a remote device that is located in a different room or building, and the playback signal can be sent to the second device over a network. In some cases, the playback signal can be sent to multiple remote devices, either co-located (e.g., together in a different room) or in different locations from one another. The playback signal can include the enhanced microphone signal and the video signal having the graphical indicator.

In some cases, some or all of method 900 is performed by a remote server. In other cases, some or all of method 900 is performed by one of the co-located devices. For instance, the co-located devices can form a distributed peer-to-peer mesh where one of the co-located devices is selected to perform the method.

Technical Effect

As noted previously, prior techniques for audio enhancement can sometimes remove sounds produced by sound sources that are visible in a video stream. By adaptively enhancing a microphone signal so that the resulting playback signal conveys sounds using either graphical indicators or retaining the sounds in the enhanced audio signal, more consistent user experiences can be provided for teleconferencing scenarios.

In addition, the disclosed techniques allow for significant flexibility in configuring audio or video enhancement for different scenarios. For instance, teleconferences for work purposes can be configured in a professional mode, where sounds such as babies crying, dogs barking, or music can be suppressed while clapping sounds can be treated as designated sounds and either allowed to pass through audio enhancement or identified with graphical indicators. Teleconferences among relatives can be configured in a family mode, where sounds such as babies crying, dogs barking, or music can be treated as designated sounds to give remote participants the sense of being present in the room with their family members.

Furthermore, as discussed above with respect to FIG. 7, some implementations can dynamically adjust which sounds are designated for adaptive enhancement based on objects detected in video stream. As a result, real-time processing can be performed that continually adapts to objects moving in and out of a video signal so that sounds made by visible objects are identified to remote users via audio and/or graphical indicators, and objects that move outside the field of view have their respective sounds suppressed so that remote users no longer perceive the presence of the object.

Device Implementations

As noted above with respect to FIG. 1, system 100 includes several devices, including a client device 110, a client device 120, a client device 130, a client device 140, and a server 150. As also noted, not all device implementations can be illustrated, and other device implementations should be apparent to the skilled artisan from the description above and below.

The term "device", "computer," "computing device," "client device," and or "server device" as used herein can mean any type of device that has some amount of hardware processing capability and/or hardware storage/memory capability. Processing capability can be provided by one or more hardware processors (e.g., hardware processing units/cores) that can execute computer-readable instructions to provide functionality. Computer-readable instructions and/or data can be stored on storage, such as storage/memory and or the datastore. The term "system" as used herein can refer to a single device, multiple devices, etc.

Storage resources can be internal or external to the respective devices with which they are associated. The storage resources can include any one or more of volatile or non-volatile memory, hard drives, flash storage devices, and/or optical storage devices (e.g., CDs, DVDs, etc.), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

In some cases, the devices are configured with a general purpose hardware processor and storage resources. In other cases, a device can include a system on a chip (SOC) type design. In SOC design implementations, functionality provided by the device can be integrated on a single SOC or multiple coupled SOCs. One or more associated processors can be configured to coordinate with shared resources, such as memory, storage, etc., and/or one or more dedicated resources, such as hardware blocks configured to perform certain specific functionality. Thus, the term "processor," "hardware processor" or "hardware processing unit" as used herein can also refer to central processing units (CPUs), graphical processing units (GPUs), controllers, microcontrollers, processor cores, or other types of processing devices suitable for implementation both in conventional computing architectures as well as SOC designs.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In some configurations, any of the modules/code discussed herein can be implemented in software, hardware, and/or firmware. In any case, the modules/code can be provided during manufacture of the device or by an intermediary that prepares the device for sale to the end user. In other instances, the end user may install these modules/code later, such as by downloading executable code and installing the executable code on the corresponding device.

Also note that devices generally can have input and/or output functionality. For example, computing devices can have various input mechanisms such as keyboards, mice, touchpads, voice recognition, gesture recognition (e.g., using depth cameras such as stereoscopic or time-of-flight camera systems, infrared camera systems, RGB camera systems or using accelerometers/gyroscopes, facial recognition, etc.), microphones, etc. Devices can also have various output mechanisms such as printers, monitors, speakers, etc.

Also note that the devices described herein can function in a stand-alone or cooperative manner to implement the described techniques. For example, the methods and functionality described herein can be performed on a single computing device and/or distributed across multiple computing devices that communicate over network(s) 160. Without limitation, network(s) 160 can include one or more local area networks (LANs), wide area networks (WANs), the Internet, and the like.

Additional Examples

Various examples are described above. Additional examples are described below. One example includes a method comprising obtaining a microphone signal captured by a first device participating in a call with a second device, detecting the presence of the designated sound using the microphone signal or a video signal captured by the first device, in an instance when the presence of the designated sound is not detected, performing first enhancement processing of the microphone signal to obtain a first enhanced microphone signal, the first enhancement processing being adapted to suppress a designated sound and one or more other sounds; in an instance when the presence of the designated sound is detected, performing second enhancement processing of the microphone signal to obtain a second enhanced microphone signal, the second enhancement processing being adapted to suppress the one or more other sounds and retain the designated sound, and sending a playback signal to the second device that is participating in the call with the first device, the playback signal including the first enhanced microphone signal or the second enhanced microphone signal.

Another example can include any of the above and/or below examples where the first enhancement processing is performed by a first audio enhancement model that has been trained using training targets that lack the designated sound, and the second enhancement processing is performed by a second audio enhancement model that has been trained using training targets that include the designated sound.

Another example can include any of the above and/or below examples where the first enhancement processing is performed by a first mode of an audio enhancement model and the second enhancement processing is performed by a second mode of the audio enhancement model, the first mode having been trained using training targets that lack the designated sound, and the second mode having been trained using training targets that include the designated sound.

Another example can include any of the above and/or below examples where the designated sound is clapping, and the one or more other sounds include noises other than clapping.

Another example can include any of the above and/or below examples where the playback signal includes the video signal and the method further comprises including, in the video signal, a graphical identifier that conveys the designated sound and including the video signal having the graphical identifier in the playback signal.

Another example can include any of the above and/or below examples where the designated sound is clapping and the graphical identifier is a clapping emoji.

Another example can include any of the above and/or below examples where the designated sound is clapping, and the method further comprising detecting two or more claps in the microphone signal using an audio classification model before performing the second enhancement processing.

Another example includes a system comprising a processor and a storage medium storing instructions which, when executed by the processor, cause the system to obtain a microphone signal captured by a first device participating in a call with a second device, detect the presence of the designated sound using the microphone signal or a video signal captured by the first device, in an instance when the presence of the designated sound is not detected, perform first enhancement processing of the microphone signal to obtain a first enhanced microphone signal, the first enhancement processing being adapted to suppress a designated sound and one or more other sounds, in an instance when the presence of the designated sound is detected, perform second enhancement processing of the microphone signal to obtain a second enhanced microphone signal, the second enhancement processing being adapted to suppress the one or more other sounds and retain the designated sound, and send a playback signal to the second device that is participating in the call with the first device, the playback signal including the first enhanced microphone signal or the second enhanced microphone signal.

Another example can include any of the above and/or below examples where the instructions, when executed by the processor, cause the system to detect the designated sound in the microphone signal with a particular audio classification model.

Another example can include any of the above and/or below examples where the instructions, when executed by the processor, cause the system to obtain a pretrained audio classification model configured to detect another sound and modify the pretrained audio classification model to detect the designated sound, the modifying resulting in the particular audio classification model.

Another example can include any of the above and/or below examples where the instructions, when executed by the processor, cause the system to obtain the video signal captured by the first device and detect the presence of the designated sound using the video signal with a particular video classification model.

Another example can include any of the above and/or below examples where the instructions, when executed by the processor, cause the system to obtain a pretrained video classification model configured to detect a particular sound source of the designated sound and modify the pretrained video classification model to detect the designated sound, the modifying resulting in the particular video classification model.

Another example can include any of the above and/or below examples where the particular video classification model is adapted to detect a particular gesture that produces the designated sound, and the pretrained video classification model is configured to detect other gestures.

Another example can include any of the above and/or below examples where the designated sound is detected from both the microphone signal and the video signal captured by the first device.

Another example can include any of the above and/or below examples where the instructions, when executed by the processor, cause the system to obtain a pretrained audio classification model configured to detect one or more other sounds, obtain a pretrained video classification model configured to detect one or more gestures other than a particular gesture that produces the designated sound, and adapt the pretrained audio classification model and the pretrained video classification model to obtain a combined model adapted to detect the presence of the designated sound.

Another example can include any of the above and/or below examples where the adapting includes removing one or more layers from the pretrained audio classification model and the pretrained video classification model, fixing weights of one or more other layers from the pretrained audio classification model and the pretrained video classification model, adding one or more new layers connected to remaining layers of the pretrained audio classification model and the pretrained video classification model, and training the one or more new layers using audio and video signals that include the designated sound and the particular gesture as training targets.

Another example can include any of the above and/or below examples where the one or more new layers including a convolutional layer, a pooling layer, and a fully-connected layer.

Another example can include any of the above and/or below examples where the instructions, when executed by the processor, cause the system to receive user input identifying the designated sound.

Another example can include any of the above and/or below examples where the instructions, when executed by the processor, cause the system to detect a particular sound source in the video signal captured by the first device, the particular sound source producing a particular sound and based at least on the particular sound source appearing in the video signal, designate the particular sound as the designated sound.

Another example includes a computer-readable storage medium storing executable instructions which, when executed by a processor, cause the processor to perform acts comprising obtaining a microphone signal captured by a first device participating in a call with a second device, detecting the presence of a designated sound using the microphone signal or a video signal captured by the first device, enhancing the microphone signal by suppressing the designated sound and one or more other sounds to obtain an enhanced microphone signal, responsive to detecting the designated sound, adding a graphical indicator that conveys the designated sound to the video signal, and sending a playback signal to the second device that is participating in the call with the first device, the playback signal including the enhanced microphone signal and the video signal having the graphical indicator.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other features and acts that would be recognized by one skilled in the art are intended to be within the scope of the claims.

The invention claimed is:

1. A method comprising:
   obtaining a microphone signal captured by a first device participating in a call with a second device;
   detecting the presence of the designated sound using the microphone signal or a video signal captured by the first device;
   in an instance when the presence of the designated sound is not detected, performing first enhancement processing of the microphone signal to obtain a first enhanced microphone signal, the first enhancement processing being adapted to suppress a designated sound and one or more other sounds;
   in an instance when the presence of the designated sound is detected, performing second enhancement processing of the microphone signal to obtain a second enhanced microphone signal, the second enhancement processing being adapted to suppress the one or more other sounds and retain the designated sound; and
   sending a playback signal to the second device that is participating in the call with the first device, the playback signal including the first enhanced microphone signal when the presence of the designated sound is not detected or the second enhanced microphone signal when the presence of the designated sound is not detected.

2. The method of claim 1, wherein the first enhancement processing is performed by a first audio enhancement model that has been trained using training targets that lack the designated sound, and the second enhancement processing is performed by a second audio enhancement model that has been trained using training targets that include the designated sound.

3. The method of claim 1, wherein the first enhancement processing is performed by a first mode of an audio enhancement model and the second enhancement processing is performed by a second mode of the audio enhancement model, the first mode having been trained using training targets that lack the designated sound, and the second mode having been trained using training targets that include the designated sound.

4. The method of claim 1, wherein the designated sound is clapping, and the one or more other sounds include noises other than clapping.

5. The method of claim 1, wherein the playback signal includes the video signal and the method further comprises:
   including, in the video signal, a graphical identifier that conveys the designated sound; and
   including the video signal having the graphical identifier in the playback signal.

6. The method of claim 5, wherein the designated sound is clapping and the graphical identifier is a clapping emoji.

7. The method of claim 1, wherein the designated sound is clapping, and the method further comprising:
   detecting two or more claps in the microphone signal using an audio classification model before performing the second enhancement processing.

8. A system comprising:
   a processor; and
   a storage medium storing instructions which, when executed by the processor, cause the system to:
   obtain a microphone signal captured by a first device participating in a call with a second device;
   detect the presence of the designated sound using the microphone signal or a video signal captured by the first device;
   in an instance when the presence of the designated sound is not detected, perform first enhancement processing of the microphone signal to obtain a first enhanced microphone signal, the first enhancement processing being adapted to suppress a designated sound and one or more other sounds;
   in an instance when the presence of the designated sound is detected, perform second enhancement processing of the microphone signal to obtain a second enhanced microphone signal, the second enhancement processing being adapted to suppress the one or more other sounds and retain the designated sound; and
   send a playback signal to the second device that is participating in the call with the first device, the playback signal including the first enhanced microphone signal when the presence of the designated sound is not detected or the second enhanced microphone signal when the presence of the designated sound is detected.

9. The system of claim 8, wherein the instructions, when executed by the processor, cause the system to:
   detect the designated sound in the microphone signal with a particular audio classification model.

10. The system of claim 9, wherein the instructions, when executed by the processor, cause the system to:
    obtain a pretrained audio classification model configured to detect another sound; and
    modify the pretrained audio classification model to detect the designated sound, the modifying resulting in the particular audio classification model.

11. The system of claim 8, wherein the instructions, when executed by the processor, cause the system to:
    obtain the video signal captured by the first device; and
    detect the presence of the designated sound using the video signal with a particular video classification model.

12. The system of claim 11, wherein the instructions, when executed by the processor, cause the system to:

obtain a pretrained video classification model configured to detect a particular sound source of the designated sound; and modify the pretrained video classification model to detect the designated sound, the modifying resulting in the particular video classification model.

13. The system of claim 12, wherein the particular video classification model is adapted to detect a particular gesture that produces the designated sound, and the pretrained video classification model is configured to detect other gestures.

14. The system of claim 8, wherein the designated sound is detected from both the microphone signal and the video signal captured by the first device.

15. The system of claim 14, wherein the instructions, when executed by the processor, cause the system to:

obtain a pretrained audio classification model configured to detect one or more other sounds;

obtain a pretrained video classification model configured to detect one or more gestures other than a particular gesture that produces the designated sound; and adapt the pretrained audio classification model and the pretrained video classification model to obtain a combined model adapted to detect the presence of the designated sound.

16. The system of claim 15, wherein the adapting includes removing one or more layers from the pretrained audio classification model and the pretrained video classification model, fixing weights of one or more other layers from the pretrained audio classification model and the pretrained video classification model, adding one or more new layers connected to remaining layers of the pretrained audio classification model and the pretrained video classification model, and training the one or more new layers using audio and video signals that include the designated sound and the particular gesture as training targets.

17. The system of claim 16, wherein the one or more new layers including a convolutional layer, a pooling layer, and a fully-connected layer.

18. The system of claim 8, wherein the instructions, when executed by the processor, cause the system to:

receive user input identifying the designated sound.

19. The system of claim 8, wherein the instructions, when executed by the processor, cause the system to:

detect a particular sound source in the video signal captured by the first device, the particular sound source producing a particular sound; and based at least on the particular sound source appearing in the video signal, designate the particular sound as the designated sound.

20. A nontransitory computer-readable storage medium storing executable instructions which, when executed by a processor, cause the processor to perform acts comprising:

obtaining a microphone signal captured by a first device participating in a call with a second device;

detecting the presence of a designated sound using the microphone signal or a video signal captured by the first device;

enhancing the microphone signal by suppressing the designated sound and one or more other sounds to obtain an enhanced microphone signal;

responsive to detecting the designated sound, adding a graphical indicator that conveys the designated sound to the video signal; and sending a playback signal to the second device that is participating in the call with the first device, the playback signal including the enhanced microphone signal when the presence of the designated sound is not detected and the video signal having the graphical indicator when the presence of the designated sound is not detected.

* * * * *